(12) United States Patent
Oouchida et al.

(10) Patent No.: US 7,117,671 B2
(45) Date of Patent: Oct. 10, 2006

(54) HYDRAULIC STEPLESS TRANSMISSION AND POWER TRANSMISSION

(75) Inventors: Takeshi Oouchida, Osaka (JP); Shuji Shiozaki, Osaka (JP); Hiroshi Matsuyama, Osaka (JP); Hidekazu Niu, Osaka (JP)

(73) Assignee: Yanmar Co, Ltd., Osaka (JP)

( * ) Notice: Subject to any disclaimer, the term of this patent is extended or adjusted under 35 U.S.C. 154(b) by 51 days.

(21) Appl. No.: 10/517,184

(22) PCT Filed: Jun. 17, 2003

(86) PCT No.: PCT/JP03/07667

§ 371 (c)(1), (2), (4) Date: Dec. 7, 2004

(87) PCT Pub. No.: WO03/106864

PCT Pub. Date: Dec. 24, 2003

(65) Prior Publication Data

US 2005/0166588 A1  Aug. 4, 2005

(30) Foreign Application Priority Data

Jun. 18, 2002 (JP) .............................. 2002-177690

(51) Int. Cl.
*F16H 39/14* (2006.01)
*F16D 31/02* (2006.01)

(52) U.S. Cl. .......................................... 60/487; 60/489

(58) Field of Classification Search ................ 60/487, 60/489

See application file for complete search history.

(56) References Cited

U.S. PATENT DOCUMENTS 3,314,234 A * 4/1967 Orshansky, Jr. .............. 60/489

(Continued)

FOREIGN PATENT DOCUMENTS

JP            62-72955 A       4/1987

(Continued)

*Primary Examiner*—Igor Kershteyn
(74) *Attorney, Agent, or Firm*—Crompton, Seager & Tufte, LLC

(57) ABSTRACT

A hydraulic stepless transmission comprises a first hydraulic system. Formed in a cylinder block are first and second plunger holes that contain first and second plungers, respectively, a hydraulic closed circuit that connects the first and second plunger holes, and distributing valve holes that contain distributing valves, which switch flow direction of hydraulic fluid in the circuit. A shaft and cylinder block synchronously rotate, with the first and second plunger holes formed in parallel to the shaft, respectively, and the swash plate of the second hydraulic system is rotatably supported around the shaft. The first and second plungers are urged toward the swash plates by springs provided in the corresponding first and second plunger holes, respectively. The swash plate of the first hydraulic system is supported by an outer ring of a first combined thrust and radial bearing that supports the shaft, and the swash plate of the second hydraulic system is supported by an outer ring of a second combined thrust and radial bearing that supports the shaft. The movement of inner rings of the first and second combined thrust and radial bearings in an axial direction to the shaft is regulated.

15 Claims, 10 Drawing Sheets

U.S. PATENT DOCUMENTS

| | | | | |
|---|---|---|---|---|
| 4,854,125 A | * | 8/1989 | Inoue | 60/489 |
| 6,324,843 B1 | * | 12/2001 | Yasuda et al. | 60/489 |
| 6,698,199 B1 | * | 3/2004 | Hayashi et al. | 60/489 |

FOREIGN PATENT DOCUMENTS

| | | |
|---|---|---|
| JP | 2002-31209 A | 1/2002 |
| WO | WO 96/31715 A1 | 10/1996 |

* cited by examiner

HYDRAULIC STEPLESS TRANSMISSION AND POWER TRANSMISSION

FIELD OF THE INVENTION

The present invention relates to a hydraulic stepless transmission and a power transmission, which are widely available in various kinds of industrial fields, such as industrial machines and vehicles.

BACKGROUND OF THE INVENTION

Heretofore, a hydraulic stepless transmission in which a first hydraulic system and a second hydraulic system are combined and a cylinder block common to the first and second hydraulic system rotates is well known. In such devices, a swash plate of the first hydraulic system, and a swash plate of the second hydraulic system are supported by a housing or the like, respectively, through combined thrust and radial bearings.

In order to suitably operate the above-mentioned combined thrust and radial bearings, it is necessary to apply a predetermined preload. Up to now, this preload has been applied by shim adjustment. However, since this shim adjustment is performed by the change in the number of sheets of shims, there is a problem in that tuning becomes complicated.

SUMMARY OF THE INVENTION

The present invention aims at providing a hydraulic stepless transmission, which can simply apply the preload to the combined thrust and radial bearings that support respective swash plates of the first and second hydraulic systems, and a power transmission equipped with it.

In order to achieve the above-described object, a hydraulic stepless transmission of the present invention comprises a first hydraulic system that has a first plunger and a swash plate, which the first plunger abuts on, and a second hydraulic system that, has a second plunger and a swash plate, which the second plunger abuts on. First and second plunger holes that contain the first and second plungers, respectively, are formed in a cylinder block. A hydraulic closed circuit that connects the first and second plunger holes is formed in the cylinder block. A distributing valve hole that contains a distributing valve for switching flow direction of hydraulic fluid in the hydraulic closed circuit is formed in the cylinder block. A shaft is provided that extends through the cylinder block. The shaft and cylinder block synchronously rotate. The above-described first and second plunger holes are formed in parallel to the above-mentioned shaft, respectively. The swash plate of the above-mentioned second hydraulic system is rotatably supported around the above-mentioned shaft. The first and second plungers are urged toward the swash plates by springs provided in the first and second plunger holes, respectively. The swash plate of the first hydraulic system is supported by an outer ring of the first combined thrust and radial bearing that supports the above-mentioned shaft. The swash plate of the second hydraulic system is supported by an outer ring of the second combined thrust and radial bearing that supports the above-mentioned shaft. Axial movement of inner rings of the first and second combined thrust and radial bearings relative to the above-mentioned shaft is regulated.

It is desirable that a stepless transmission according to an embodiment comprises a first regulating member that has a surface parallel to a side face of the inner ring of the first combined thrust and radial bearing and is spaced apart by a minute distance from the side face of the inner ring, and a second regulating member that has a surface that is parallel to a side face of the inner ring of the second combined thrust and radial bearing and is spaced apart by a minute distance from the side face of the inner ring.

In the stepless transmission according to the embodiment, it is desirable that the above-mentioned distributing valve hole be parallel to the above-mentioned shaft and closer to the shaft than the plunger hole, and an oil passage be formed in a radial direction that connects the above-mentioned plunger hole and distributing valve hole.

In the stepless transmission according to the embodiment, it is desirable that the above-mentioned distributing valve hole be formed so as to be in parallel to the above-mentioned shaft and to extend through the cylinder block.

In the stepless transmission according to the embodiment, it is desirable that a high pressure oil chamber and a low pressure oil chamber be juxtaposed along an axial direction in the above-mentioned cylinder block so as to be closer to the above-mentioned shaft than the above-mentioned first and second plunger holes, a spline section is formed in the above-mentioned shaft, the above-mentioned shaft is fit into the cylinder block in the spline section, and the above-mentioned low pressure oil chamber communicates with the spline section of the above-mentioned shaft.

In the stepless transmission according to the embodiment, it is desirable that an outer circumferential surface of the swash plate of the second hydraulic system be formed through machining by using a first machining central axis, which is a line perpendicular to a swash plate surface of this swash plate, a machining central axis, which is a center line of the above-mentioned shaft, and a second machining central axis, which is a line parallel to a center line of the above-mentioned shaft and is offset to a side in which a gap narrows between a surface of the above-mentioned swash plate surface and a surface opposite to the swash plate surface.

In addition, it is also possible to construct a power transmission from the stepless transmission according to any one of the embodiments mentioned above, a device which transmits or shuts down the power to the above-mentioned shaft, and a device which inputs turning force of the swash plate of the second hydraulic system, and outputs the rotation of the swash plate of the second hydraulic system in the same direction, or a reverse direction.

DETAILED DESCRIPTION OF THE PREFERRED EMBODIMENTS

Hereafter, a hydraulic stepless transmission (hereinafter, a stepless transmission 20) used for driving an industrial vehicle according to embodiments of the present invention, and a power transmission 400 including this stepless transmission 20 will be explained according to FIGS. 1 to 14.

Power Transmission

Figure 1:
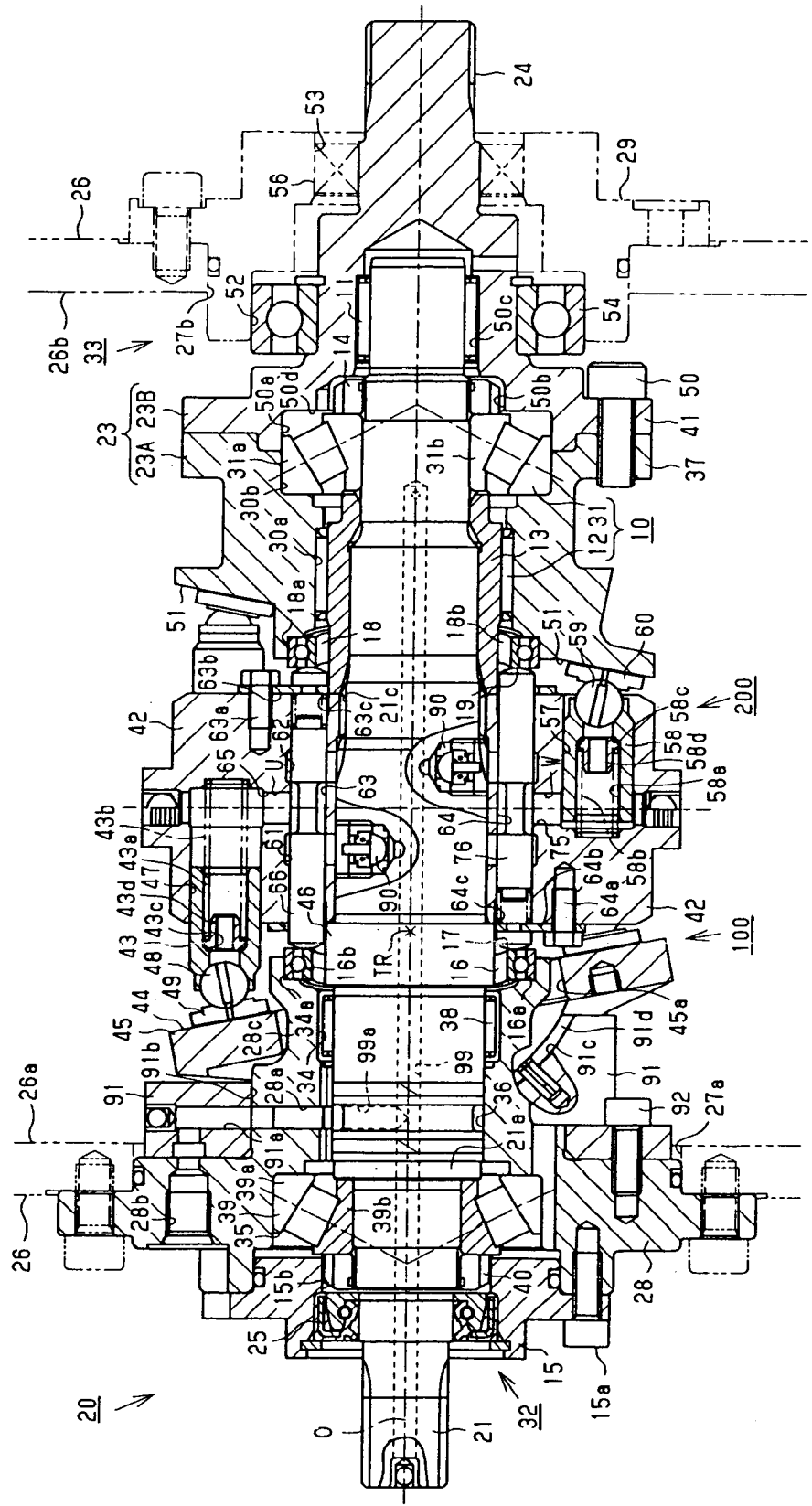
FIG. 1 is a cross-sectional plan view of a stepless transmission according to one embodiment of the present invention.

As shown in FIG. 1, the stepless transmission 20 is contained in a housing 26 of a power unit of an industrial vehicle. The stepless transmission 20 comprises a first hydraulic system 100 and a second hydraulic system 200, and a hydraulic closed circuit C (refer to FIGS. 11 and 12) is formed between the first hydraulic system 100 and the second hydraulic system 200.

Figure 5:
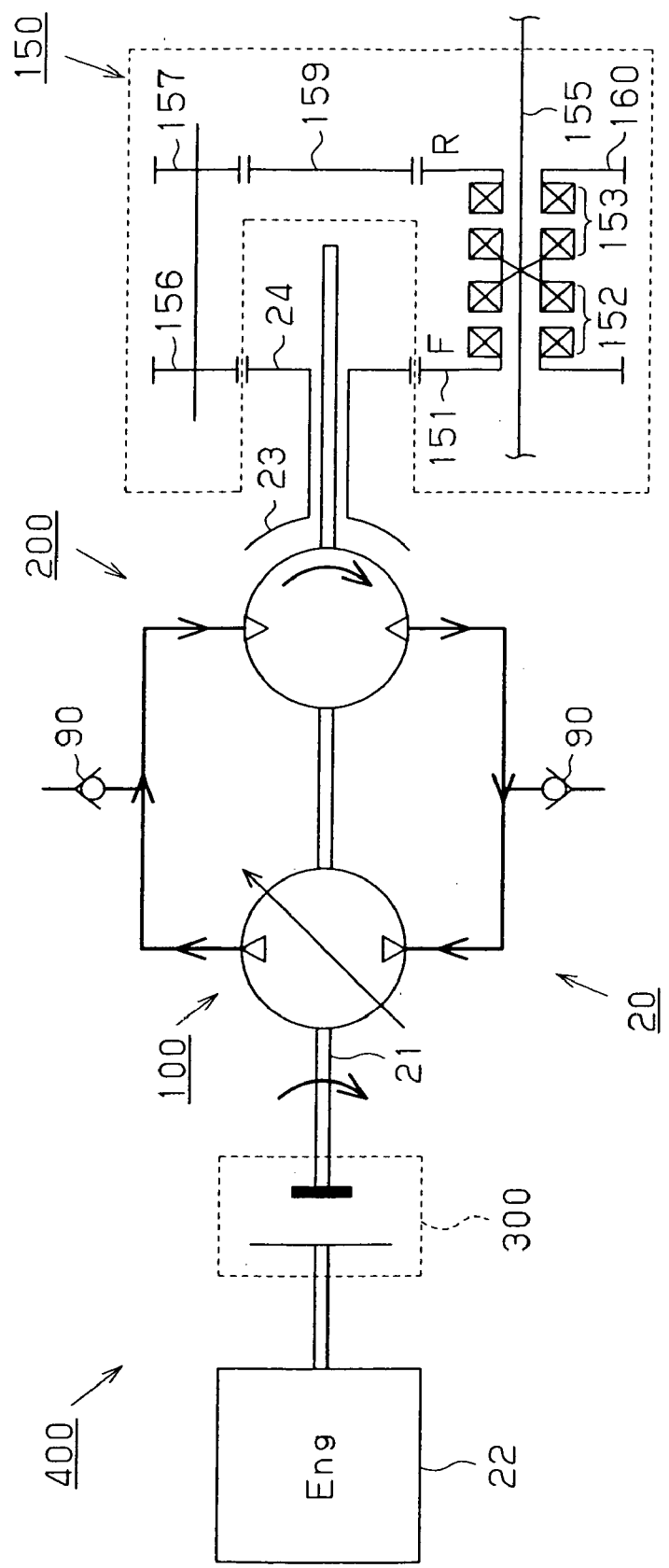
FIG. 5 is a conceptual drawing of a power transmission.

FIG. 5 is a conceptual drawing showing the power transmission 400 including the stepless transmission 20. An input shaft 21 of the stepless transmission 20 is coupled with a crankshaft of an engine 22 through a clutch mechanism 300. A gearshift device 150 (CST) is connected to a yoke 23 located in an output side of the stepless transmission 20. The above-mentioned clutch mechanism 300 is engaged or disengaged by interlocking with, for example, a foot clutch pedal which is not shown.

The gearshift device 150 comprises an output shaft 155 which transmits drive torque to a final reduction gear (not shown), and further comprises a forward clutch 152 coupled with the output shaft 155, a reverse clutch 153, and a gear train.

The drive clutch plate of the forward clutch 152 comprises a gear 151 which is meshed with the output gear 24. Then, when the forward clutch 152 is engaged by the operation of the shift lever 146 (refer to FIG. 13), driving torque is transmitted to the final reduction gear from the yoke 23 through the output gear 24, gear 151, forward clutch 152, and output shaft 155.

Moreover, a gear 160 is coupled with the output gear 24 through an idler gear 156 and the idler gear 157 which has a common shaft to the idler gear 156, and an intermediate gear 159. This gear 160 is coupled with a drive clutch plate of the reverse clutch 153. Then, when the reverse clutch 152 is engaged by the operation of the shift lever 146, drive torque is transmitted to the final reduction gear from the yoke 23 through the output gear 24, idler gears 156 and 157, intermediate gear 159, gear 160, and output shaft 155.

In addition, in this embodiment, the above-mentioned engine 22 corresponds to a motor, the clutch mechanism 300 corresponds to a connection/disconnection device, and the gearshift device 150 corresponds to a normal/reverse rotation changeover device, respectively.

Thus, the clutch mechanism 300 is equivalent to the "device which transmits or shuts down the power to the shaft." Moreover, the gearshift device 150 is equivalent to the "device which transmits a turning force of the swash plate of the second hydraulic system, and outputs the rotation of the swash plate of the second hydraulic system in the same direction or a reverse direction."

Stepless Transmission

The housing 26 of the stepless transmission 20 comprises a pair of support sidewalls 26a and 26b which face each other. Mounting holes 27a and 27b are formed in both the support side walls 26a and 26b, and the side wall members 28 and 29 are fit with each mounting holes 27a and 27b from the outside of the housing 26, respectively. Then, sidewall members 28 and 29 are fastened tightly and fixed with a plurality of bolts to corresponding support sidewalls 26a and 26b respectively.

Figure 2:
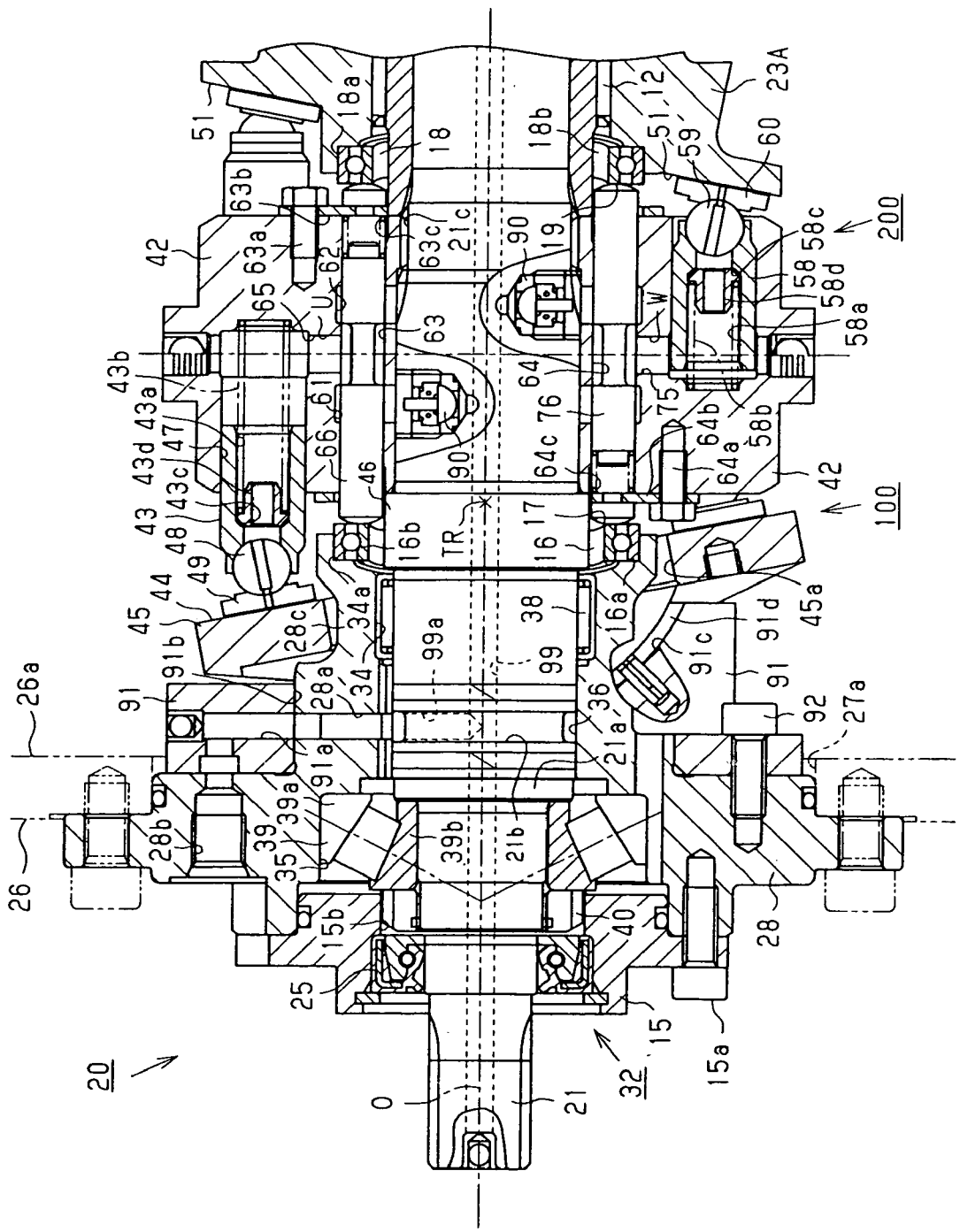
FIG. 2 is an enlarged cross-sectional view showing a left side section of the stepless transmission.

As shown in FIGS. 1 and 2, an input end of the input shaft 21 of the stepless transmission 20 is rotatably supported through a bearing section 32 by the sidewall member 28 of the housing 26. Moreover, the yoke 23 as an output rotating section is rotatably supported by the sidewall member 29 of the housing 26 through a bearing section 33. Then, an output end of the input shaft 21 extends through and is rotatably supported by the yoke 23 through a bearing section 10 so as to be located coaxially with the yoke 23.

As shown in FIG. 2, a protruding section 28c which protrudes inward from a center of an internal surface is formed in the sidewall member 28. Moreover, a pair of bearing receiving holes 34 and 35 is juxtaposed to the sidewall member 28 so as to be located coaxially. The outer bearing receiving hole 35 has an inner diameter larger than the inner bearing receiving hole 34. A through hole 36 having a diameter smaller than the inner bearing receiving hole 34 is formed in the side wall member 28 between both the bearing receiving holes 34 and 35 so as to be coaxial with the bearing receiving holes 34 and 35. A needle bearing 38 as a radial bearing is located in the inner bearing receiving hole 34. Moreover, a conical roller bearing 39 as a combined thrust and radial bearing is fit and fixed to the outer bearing receiving hole 35.

Then, the input end of the input shaft 21 is supported by the sidewall member 28 through the needle bearing 38 and conical roller bearing 39. Moreover, the opening of the outer bearing receiving hole 35 is covered with a cover 15 fastened to the side wall member 28 with bolts 15a. As shown in FIG. 2, the input shaft 21 is inserted into the through hole 15b of the cover 15 through a sealing member 25.

The sidewall member 28 is a housing of the needle bearing 38 and conical roller bearing 39, and consists of a single member. As shown in FIG. 2, an outer ring 39a of the conical roller bearing 39 abuts on the bottom and an inner circumferential surface of a stepped section in the backside of the bearing receiving hole 35. A nut 40 is screwed on to an outer circumference of the input end of the input shaft 21 in the through hole 15b of the cover 15, and this nut 40 abuts on an inner ring 39b of the conical roller bearing 39.

In addition, in the input end of the input shaft 21, a flared section 21a is formed in the input shaft 21 so as to be adjacent to the inner ring 39b of the conical roller bearing 39, and regulates the movement of the inner ring 39b.

Moreover, as shown in FIGS. 1 and 2, in the through hole 15b of the cover 15, the inner diameter of a part containing the nut 40 is set smaller than the maximum outer diameter (outer diameter by the side of the cover 15) of the inner ring 39b of the conical roller bearing 39. Furthermore, a side face by the side of the inner ring 39b of the cover 15 is located in the vicinity of the inner ring 39b while being formed so as to be parallel to and facing a side face of the inner ring 39b, and is formed in a size so that the side faces are able to be mutually abutting.

In this embodiment, the distance between the side face of the cover 15 and the inner ring 39b is made minute. Accordingly, when the cylinder block 42 pushes the outer ring 39a of the conical roller bearing 39 through a cradle 45, a cradle holder 91, and the sidewall member 28 which will be described later, the inner ring 39b abuts first on the cover 15. The maximum clearance between the outer ring 39a and inner ring 39b of the conical roller bearing 39 are regulated by this abutting.

The bearing section 32 is constructed by the conical roller bearing 39 and needle bearing 38. The needle bearing 38 is equivalent to the radial bearing.

A bearing mount stepped-section 34a (refer to FIG. 2) flared more largely than the bearing receiving hole 34 is formed in an opening section of the bearing receiving hole 34, and a radial bearing 16 is installed in the bearing mount stepped-section 34a.

The above-mentioned radial bearing 16 comprises an outer ring 16a and an inner ring 16b, and this outer ring 16a abuts on and is fixed to the bottom and peripheral surface of the stepped section of the bearing mount stepped-section 34a whose diameter is flared. As shown in FIG. 2, the radial bearing 16 is located with its axis oblique to the axis O of the cylinder block 42 at a constant angle, and its inner ring 16b constructs a cam for making first relay valves 66 slide in the direction of the axis O (hereafter, this may be also called the axial direction) with a prescribed timing. A side face on the output side of the inner ring 16b is a cam surface 17.

In addition, when the cylinder block 42 is attached to the input shaft 21, the axis O of the cylinder block 42 coincides with the axis (center line) of the input shaft 21.

First Hydraulic System

The first hydraulic system 100 comprises the input shaft 21, cylinder block 42 and first plungers 43, and cradle 45 including a swash plate surface 44 abutting on the above-described first plungers 43.

A substantially plate-like cradle holder 91 is fastened to an internal side surface of the sidewall member 28 with a plurality of bolts 92. A through hole 91b extends along the axis of the input shaft 21 and is formed in the cradle holder 91. The protruding section 28c of the above-mentioned sidewall member 28 is fit into the through hole 91b. A through hole 45a is formed in a center section of the cradle 45, and the protruding section 28c is inserted into the through hole 45a.

In a side face of the cradle holder 91 by the side of the cylinder block 42, a support face 91c is formed in a depressed manner with its circular arc section in an edge part of the through hole 91b. The cradle 45 is tiltably supported through a half bearing 91d by the support face 91c. Specifically, as shown in FIG. 2, the above-mentioned cradle 45 is tiltable with centering a trunnion axis TR which is orthogonal to the axis O of the cylinder block 42. Thus, an upright position of the cradle 45 is a position where a virtual plane including the swash plate surface 44 becomes orthogonal to the axis O. Then, on the basis of this upright position, the cradle 45 is tiltable between a position (first position) of tilting at a prescribed angle in a counterclockwise direction, and a position (second position) of tilting at a prescribed angle in a clockwise direction in FIG. 2.

In this embodiment, the clockwise direction is termed the positive direction and the counterclockwise direction is termed the negative direction in FIG. 2 on the basis of the position at the time of the swash plate surface 44 being located in the upright position.

Figure 14:
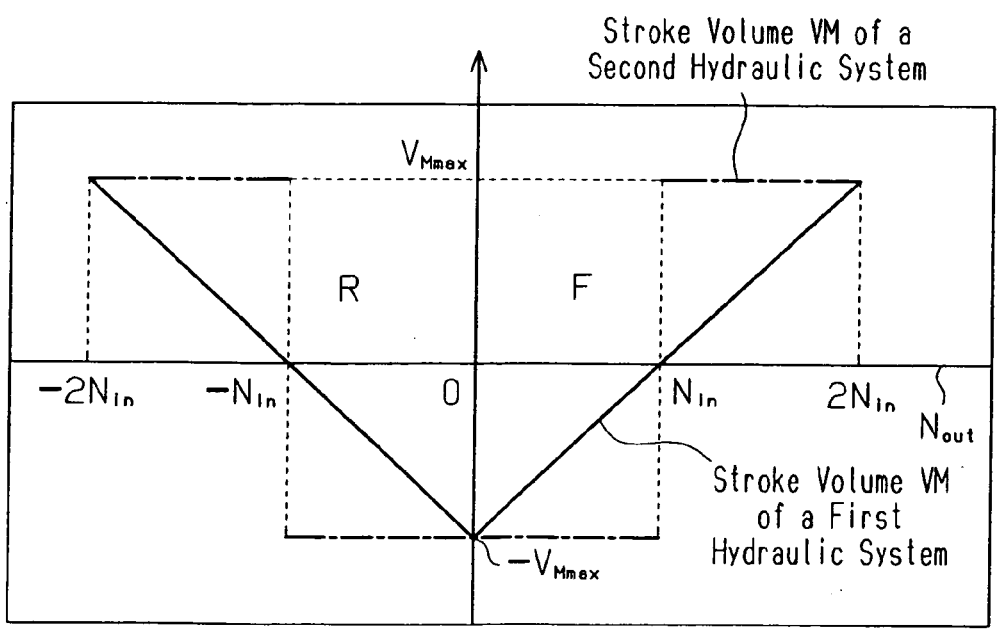
FIG. 14 is a characteristic graph showing the relationship between the cylinder capacity and the output rotation rate.

Then, in this embodiment, with bordering the output rotation rate Nout=Nin is shown in FIG. 14, and the cradle 45 tilts in the negative direction when Nout>Nin, and the cradle 45 tilts in the positive direction when Nout<Nin. In addition, the output rotation rate is the rotation rate of the yoke 23.

FIG. 2 shows the state in which the swash plate surface 44 tilts to the maximum negative tilt angular position when the cradle 45 is located in the first position. Moreover, when the cradle 45 is located in the second position, the swash plate surface 44 is located at a maximum positive tilt angular position. The cradle 45 is equivalent to the swash plate of the first hydraulic system 100, that is, a variable displacement type hydraulic system.

Figure 4:
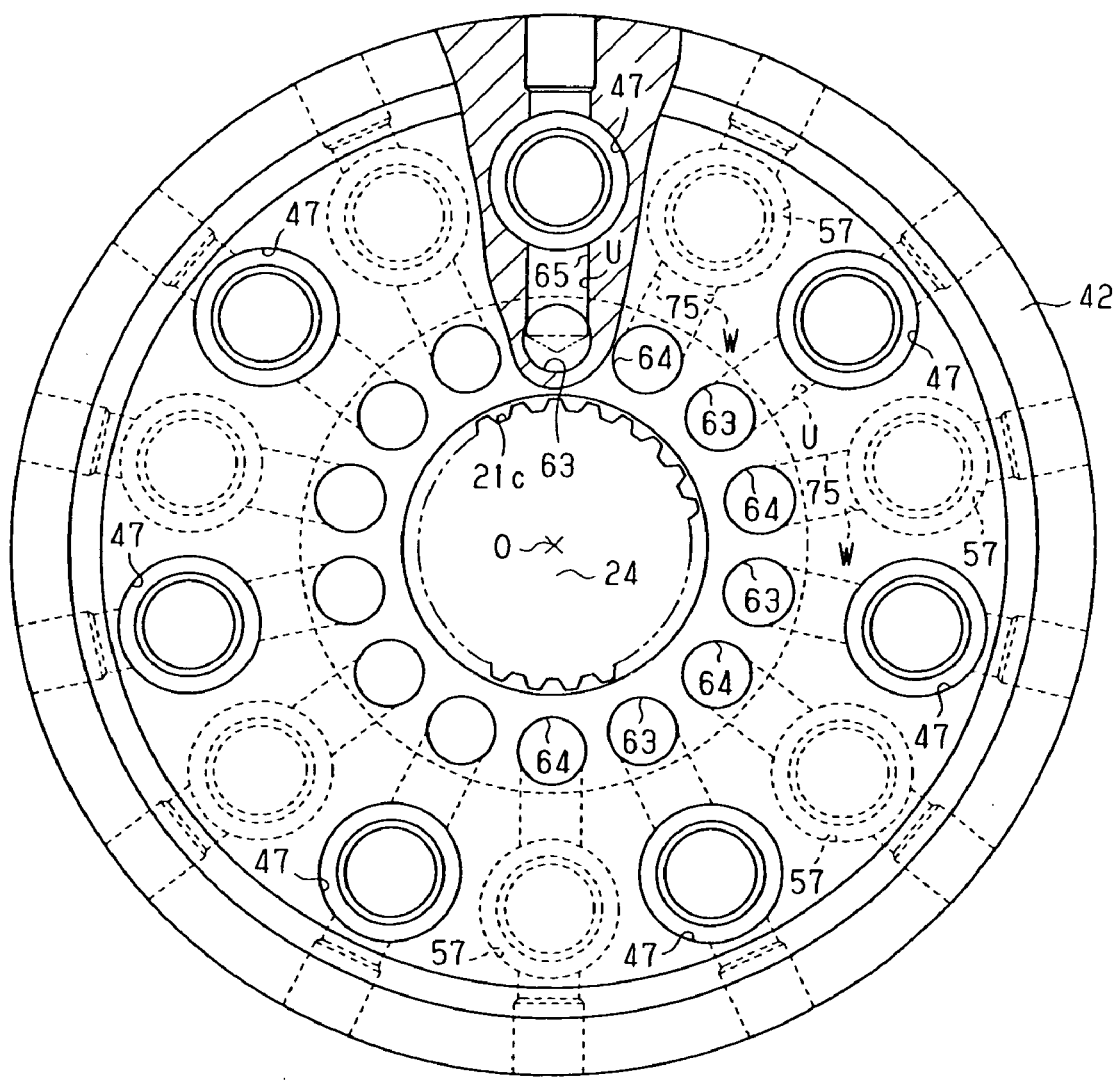
FIG. 4 is a cross-sectional view of a cylinder block of the stepless transmission.

The cylinder block 42 is integrally coupled by spline fitting with the input shaft 21, and the input end is locked together by a locking flange 46 of the input shaft 21. That is, in a peripheral surface of the input shaft 21 a spline section 21c is formed of a plurality of keyways, which is parallel to the axis O and is arranged in a peripheral direction of the input shaft 21, as shown in FIG. 4. A plurality of grooves formed in an inner circumferential surface of the cylinder block 42 is fit to this spline section 21c. The above-mentioned cylinder block 42 is substantially formed in a cylindrical shape, and outer circumferential surfaces of both ends are shrunk in diameter rather than an outer circumferential surface of a center section.

As shown in FIG. 4, a plurality of first plunger holes 47 is annularly arranged around the center of rotation (axis O) in the cylinder block 42, and is extendedly provided in parallel to the axis O. The opening of each first plunger hole 47 is in the side of the cradle 45.

A first plunger 43 is slidably located in each first plunger hole 47. Each first plunger 43 is substantially formed in a cylindrical shape, and each spring storage hole 43a is formed on its axis. A locking stepped-section 43c is formed in an inner end of each spring storage hole 43a. In each spring storage hole 43a, a spring locking member 43d and a coil spring 43b are contained, which are caught together by locking stepped-section 43c. Each coil spring 43b abuts on the bottom of the first plunger hole 47, and urges the first plunger 43 toward the cradle 45 through the spring locking member 43d. At the end of each first plunger 43, a steel ball 48 is rotatably fit, and each first plunger 43 abuts on the swash plate surface 44 through the steel ball 48 and a shoe 49.

Then, since each first plunger 43 is pushed to the swash plate surface 44 of the cradle 45 by the urging force of each coil spring 43b, the cradle 45 pushes the outer ring 39a of the conical roller bearing 39 through the cradle holder 91 and sidewall member 28. For this reason, a force in an axial direction (a direction of the axis O of the cylinder block 42) works constantly on the outer ring 39a of the conical roller bearing 39. Accordingly, the complicated operation by shim adjustment for the conical roller bearing 39 is omitted and preload is given to the conical roller bearing 39.

The swash plate surface 44 in a slant state reciprocates each first plunger 43 with the rotation of the cylinder block 42 to provide action for suction and discharge strokes.

Second Hydraulic System

The second hydraulic system 200 comprises a plurality of second plungers 58 slidably located in the cylinder block 42, and the yoke 23 which has a rotating slope 51 abutting on the above-mentioned second plungers 58.

Figure 3:
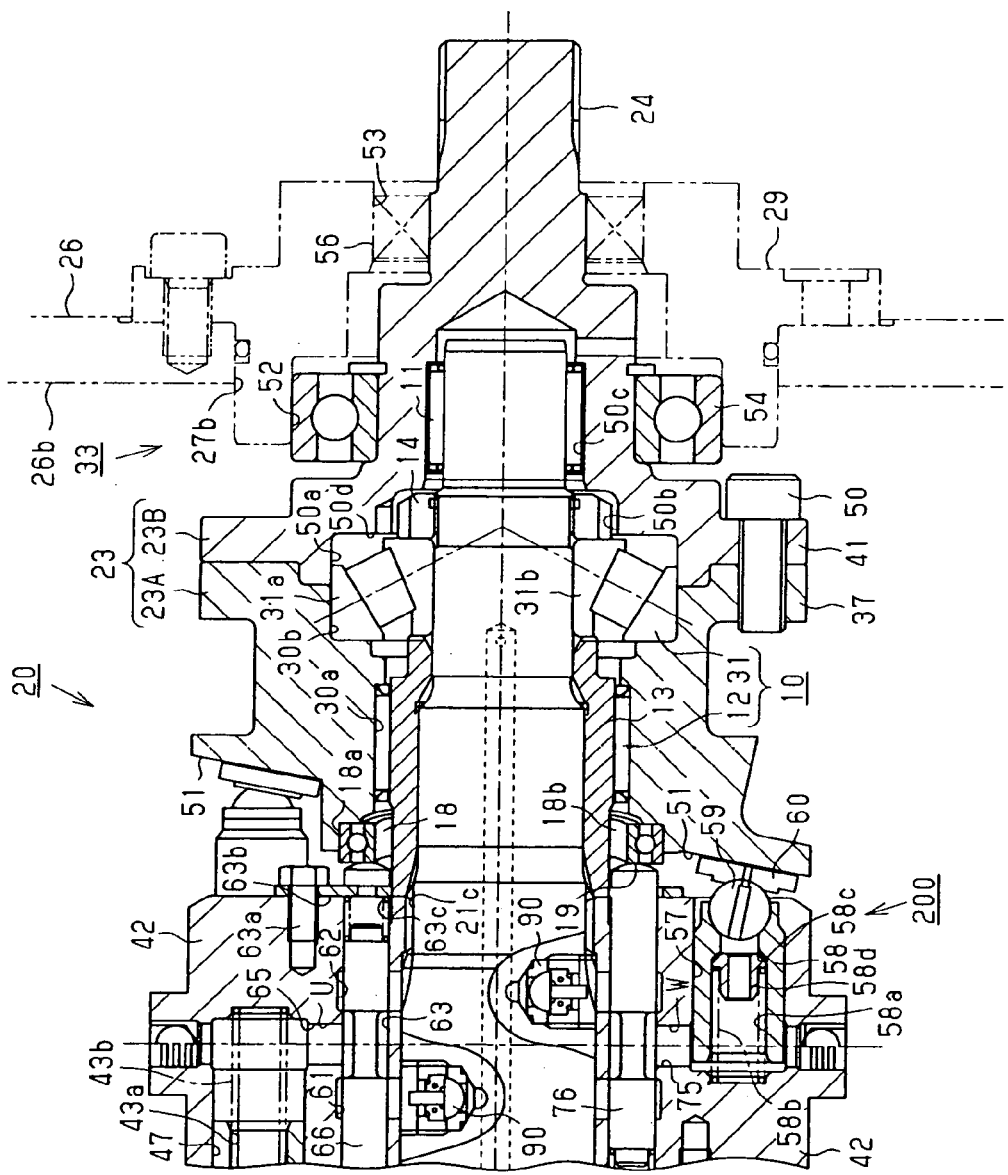
FIG. 3 is an enlarged cross-sectional view showing a right side section of the stepless transmission.

As shown in FIGS. 1 and 3, in the sidewall member 29, a bearing receiving hole 52 and a through hole 53 with a diameter smaller than the bearing receiving hole 52 are formed coaxially, respectively. Then, a ball bearing 54 is fit into the bearing receiving hole 52, and a bearing 56 is fit into the through hole 53.

The yoke 23 comprises a first yoke member 23A and a second yoke member 23B. The first yoke member 23A is formed substantially cylindrical, and the second yoke member 23B is formed in a cylindrical shape with a bottom. Then, both the yoke members 23A and 23B are integrally coupled by a connection flange 37 formed in a base end section of the first yoke member 23A, and a connection flange 41 formed in an end section of the second yoke member 23B, being mutually bound tight by bolts 50 abutting on each other.

The first yoke member 23A is equivalent to the swash plate of the second hydraulic system 200. Moreover, the yoke 23 is rotatably supported by the housing 26 substantially at a central outer circumference in the longitudinal direction and an outer circumference of an output end of the second yoke member 23B being fit into the ball bearing 54 and bearing 56 respectively.

The output end of the second yoke member 23B is formed in a diameter smaller than that of an outer circumferential surface which fits the ball bearing 54, and protrudes outside from the through hole 53. The output gear 24 is engraved in the output end of the second yoke member 23B. The rotating slope 51 is formed in an end face of the first yoke member 23A by the side of the cylinder block 42, and slants at a definite angle relative to the axis O. The rotation slope 51 is equivalent to the swash plate surface.

The first yoke member 23A comprises a bearing hole 30a and a bearing receiving hole 30b, which communicate with each other while comprising an axis common to the axis O. While being flared in a diameter larger than that of the bearing hole 30a, the bearing receiving hole 30b is open toward a base end surface of the first yoke member 23A.

On the other hand, a bearing receiving hole 50a with a large diameter, a storage hole 50b with a middle diameter, and a bearing receiving hole 50c with a small diameter which have an axis common to the axis O are sequentially formed in a range from the end face of the connection flange 41 substantially to a center section in the second yoke member 23B. The bearing receiving hole 50a and bearing receiving hole 30b have equal diameters.

A conical roller bearing 31 as a combined thrust and radial bearing is fit and fixed to the above-mentioned bearing receiving hole 30b. That is, as shown in FIG. 3, an outer ring 31a of the conical roller bearing 31 abuts on the bottom and an inner circumferential surface of a stepped section in the backside of the bearing receiving hole 30b. The inner ring 31b of the conical roller bearing 31 is fit into the input shaft 21. Moreover, a sleeve 13 is fit on the input shaft 21 between the inner ring 31b and an end portion of the cylinder block 42 by the side of the rotating slope 51.

Then, a nut 14 is screwed on the outer circumference by the side of the output end of the input shaft 21 inside the storage hole 50b, and abuts on the inner ring 31b of the conical roller bearing 31. The inner ring 31b is pushed toward the left in FIG. 3 by this nut 14 being rotated and pushes the sleeve 13, and the sleeve 13 abuts on an end face of the cylinder block 42 by the side of the rotating slope 51.

As shown in FIGS. 1 and 3, the inner diameter of the storage hole 50b is made smaller than the maximum outer diameter (outer diameter by the side of the side wall member 29) of the inner ring 31b of the conical roller bearing 31. Furthermore, a locking stepped-section 50d formed between the bearing receiving hole 50a of the second yoke member 23B, and the storage hole 50b with a smaller diameter, comprises a face parallel to a side face of the inner ring 31b, which the locking stepped-section 50d faces, and is arranged adjacently to the inner ring 31b so that they are able to abut on each other.

In this embodiment, the distance between the locking stepped-section 50d and inner ring 31b is minute. Accordingly, when the cylinder block 42 pushes the outer ring 31a of the conical roller bearing 31 through the first yoke member 23A, the inner ring 31b first abuts on the locking stepped-section 50d. The maximum clearance between the outer ring 31a and the inner ring 31b of the conical roller bearing 31 is regulated by this abutting.

A needle bearing 12 is located between the sleeve 13 and bearing hole 30a, and the input shaft 21 is rotatably supported by the first yoke member 23A owing to the needle bearing 12 and conical roller bearing 31. Moreover, an output end located closer to an end than a threaded section of the nut 14 of the input shaft 21 is supported rotatably relative to the second yoke member 23B through the needle bearing 11 located at the bearing receiving hole 50c of the second yoke member 23B.

The bearing section 10 is constructed by the needle bearing 12 and conical roller bearing 31. The needle bearing 12 is equivalent to the radial bearing. Moreover, the bearing section 33 is constructed by the ball bearing 54 and bearing 56.

A radial bearing 18 is located in an opening of the first yoke member 23A by the side of the cylinder block 42. The above-mentioned radial bearing 18 comprises an outer ring 18a and an inner ring 18b, and this outer ring 18a abuts on and is fixed to the bottom and peripheral surface of the stepped section of the opening.

The above-mentioned radial bearing 18 is located with its axis being oblique to the axis O of the cylinder block 42 at a constant angle, and its inner ring 18b constructs a cam for making second relay valves 76 slide in the direction of the axis O in a prescribed timing. Therefore, an input side of the inner ring 18b becomes a cam surface 19.

Production Method for the First Yoke Member

Here, a production method of the first yoke member 23A will be explained according to FIGS. 7(a), 7(b), 8(a), 8(b), 9(a), 9(b), and FIGS. 10(a) and 10(b).

Figure 7A:
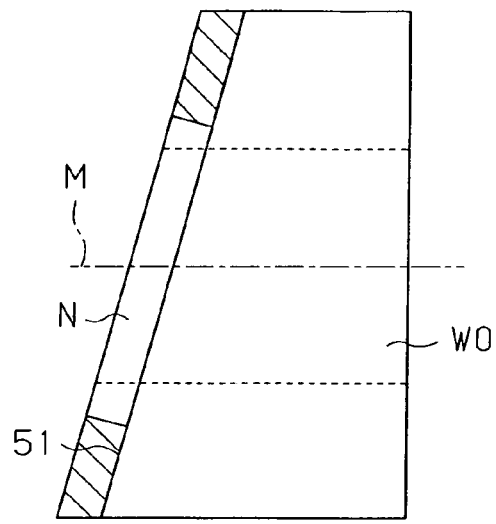
FIGS. 7(a) and 7(b) are explanatory diagrams of the production process of a first yoke member.
Figure 7B:
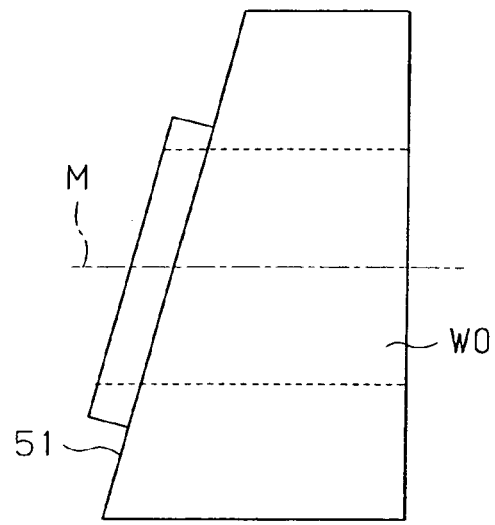
Figure 8A:
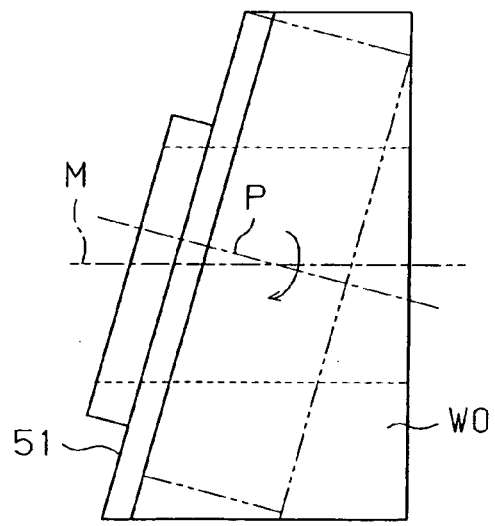
FIGS. 8(a) and 8(b) are explanatory diagrams of the production process of the first yoke member.
Figure 8B:
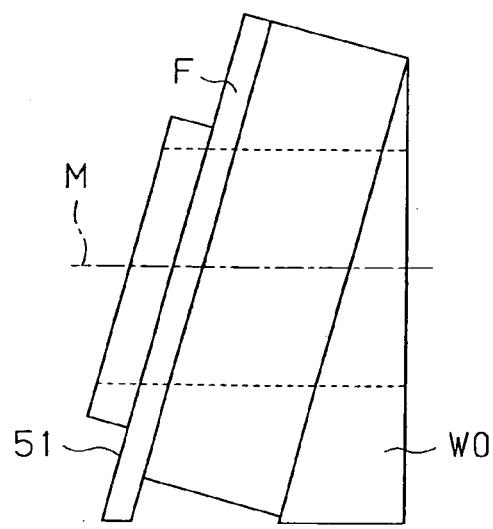

First, a tube-like material WO is cut. At this time, as shown in FIGS. 7(a) and 7(b), the right end of the material WO is cut so that its end face may cross perpendicularly to an axis M, and the left end of the material WO is cut so that its end face may tilt relative to the axis M at a prescribed angle. The axis M of the material WO coincides with the axis O of the cylinder block 42. Then, as for the above-mentioned left end, the slope is cut while leaving the machining allowance N for the radial bearing 18 on which the second relay valves 76 abut. This slope becomes the rotating slope 51. Moreover, the machining allowance N has the height of perpendicularly protruding from the rotating slope 51, and is substantially circular. In FIG. 7(a), hatched portions show cutout portions of the material WO.

Next, an outer circumferential surface of the material WO is cut while making a line P perpendicular to the rotation slope 51 of a first-machining central axis, that is, a rotation axis. In addition, the line P is set so that all the outer circumferential surface of the material WO can be cut while intersecting with the axis M. At this time, the material WO is cut so as to leave a flange section F near the rotation slope 51. Moreover, at this time, in order to adjust the rotation balance of the first yoke member 23A, the side with the larger axial dimension (lower portion in FIGS. 8(a) and 8(b)) is cut more than the smaller side (upper portion in FIGS. 8(a) and 8(b)).

Figure 9A:
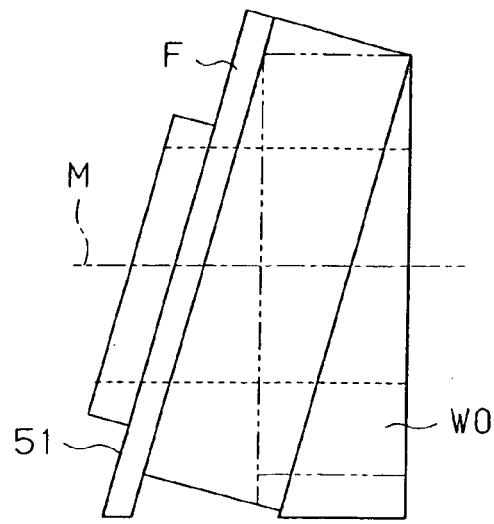
FIGS. 9(a) and 9(b) are explanatory diagrams of the production process of the first yoke member.
Figure 9B:
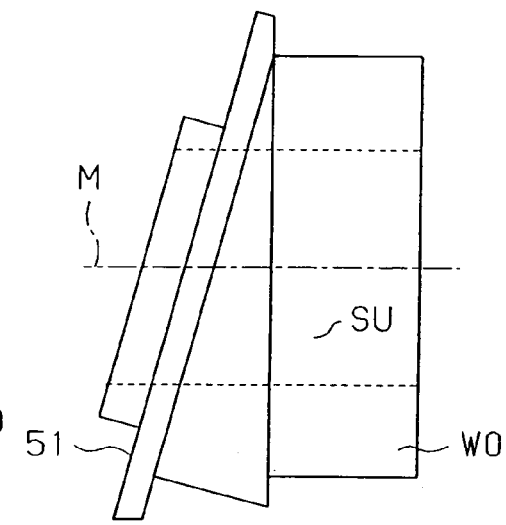

Next, the outer circumferential surface of the material WO is cut while making the axis O (center line) of the cylinder block 42 the machining central axis, that is, making the axis M of the material WO the machining central axis, and a peripheral surface SU including the outer circumferential surface for the connection flange 37 is formed (refer to FIGS. 9(a) and 9(b)). In addition, the axis O of the cylinder block 42 after attachment coincides with the axis (center line) of the input shaft 21.

Figure 10A:
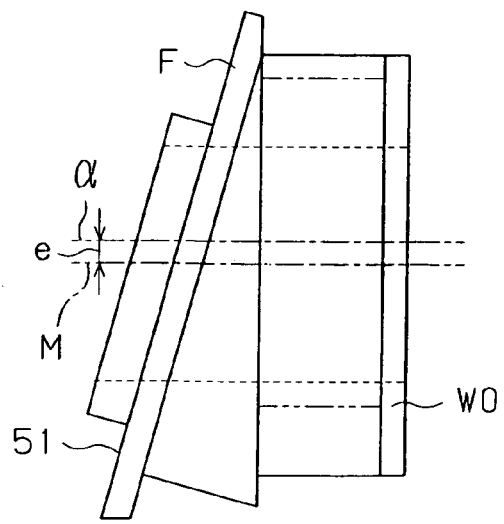
FIGS. 10(a) and 10(b) are explanatory diagrams of the production process of the first yoke member.
Figure 10B:
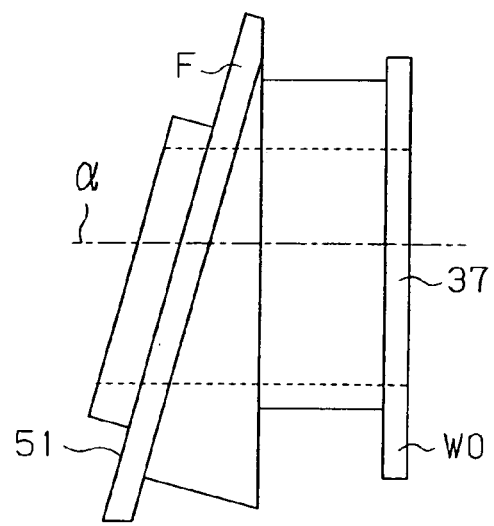

Then, a line α is assumed parallel to the axis O (center line) of the cylinder block 42, that is, parallel to the axis M of the material WO, and is offset by a predetermined amount e as shown in FIG. 10(a) referred to above. In other words, the line α is offset to a side in which a gap narrows between the rotating slope 51 and a surface (this later becomes the connection flange 37), which faces the rotating slope 51.

The connection flange 37 is formed by cutting the outer circumferential surface of the material WO while making this line α a second-machining central axis. Then, the bearing hole 30a and bearing receiving hole 30b, which are shown in FIG. 3, are formed by cutting work while making the axis O a machining central axis. Moreover, the stepped-section of the opening for the radial bearing 18 is cut according to the tilt direction of the radial bearing 18.

Again, the structure of a stepless transmission 20 will be explained.

As shown in FIG. 4, in a center section of the above-mentioned cylinder block 42, the same number of second plunger holes 57 as the first plunger holes 47 are annularly arranged around a center of rotation, and are extendedly provided in parallel to the axis O. A pitch circle of these second plunger holes 57 is made to be coaxial with and in the same diameter as a pitch circle of the above-mentioned first plunger holes 47. Moreover, each second plunger hole 57 is located while being shifted by a half pitch from each first plunger hole 47 mutually in the peripheral direction of a cylinder block 42 as shown in FIG. 4 so as to be located between mutually adjacent first plunger holes 47.

Each second plunger hole 57 is open toward the above-mentioned yoke 23 in an end face of the cylinder block 42. Each second plunger 58 is slidably located at each second plunger hole 57. Each second plunger 58 is substantially formed in a cylindrical shape, and a spring storage hole 58a is formed in the second plunger 58. A locking stepped-section 58c is formed in an inner end of each spring storage hole 43a. In each spring storage hole 58a, a spring locking member 58d and a coil spring 58b are contained, which are caught together by the locking stepped-section 58c. Each coil spring 58b abuts on the bottom of the second plunger hole 57, and urges the plunger 58 toward the rotation slope 51 through the spring locking member 58d. At the end of each second plunger 58, a steel ball 59 is rotatably fit. The plungers 58 abut on the rotation slope 51 through the steel balls 59 and shoes 60, respectively.

Then, since the plungers 58 are pushed to the rotation slope 51 of the first yoke member 23A by the urging forces of the coil springs 58b, the first yoke member 23A pushes the outer ring 31a of the conical roller bearing 31. For this reason, a force in the axial direction (the direction of the axis O of the cylinder block 42) works constantly on the outer ring 31a of the conical roller bearing 31. Accordingly, complicated operation by shim adjustment for the conical roller bearing 31 is omitted and a preload is provided to the conical roller bearing 31.

Since the plungers 58 reciprocate in connection with the relative rotating between the above-mentioned rotating slope 51 and cylinder block 42, suction and discharge strokes are repeated. In this embodiment, the maximum stroke volume Vpmax of the first hydraulic system 100 is set so as to become the same as the maximum stroke volume VMmax of the second hydraulic system 200.

Hydraulic Closed Circuit

Next, the hydraulic closed circuit C formed between the above-mentioned first hydraulic system 100 and second hydraulic system 200 will be explained.

In the inner circumferential surface of the cylinder block 42, a first oil chamber 61 and a second oil chamber 62, which are circular are juxtaposed along an axial direction of the cylinder block 42. The first oil chamber 61 is equivalent to the high-pressure oil chamber, and the second oil chamber 62 is equivalent to the low-pressure oil chamber.

The second oil chamber 62 communicates with the spline section 21c as shown in FIGS. 1 and 3, and it is made so that a part of the hydraulic fluid in the second oil chamber 62 can be supplied as a lubricant. In addition, the hydraulic fluid supplied to the spline section 21c is leaked to the outside of the cylinder block 42.

First valve holes 63 are formed in the cylinder block 42 so as to be parallel to the axis O of the cylinder block 42. The first valve holes 63 communicate with the first oil chamber 61 and the second oil chamber 62. The number of the first valve holes 63 is equal to the number of the first plunger holes 47.

In addition, second valve holes 64 are formed in the cylinder block 42 so as to become parallel to the axis O of the cylinder block 42. The second valve holes 64 communicate with the first oil chamber 61 and the second oil chamber 62. The number of the second valve holes 64 is equal to the number of the second plunger holes 57. Then, the above-mentioned first valve holes 63 and second valve holes 64 are annularly located around the axis O of the cylinder block 42, respectively.

The first valve holes 63 and second valve holes 64 are equivalent to the distributing valve holes. A pitch circle of the first valve holes 63 is made to be coaxial with and in the same diameter as a pitch circle of the second valve holes 64. Moreover, both valve holes are made to have the diameter of the pitch circle, which is smaller than that of the pitch circle of the first plunger holes 47 and second plunger holes 57, so as to be located more inside than the first plunger holes 47 and second plunger holes 57, that is, to be located by the side of the input shaft 21 rather than the first plunger holes 47 and second plunger holes 57. Moreover, each first valve hole 63 is located with being shifted by a half pitch from each second valve hole 64 mutually in the peripheral direction of the cylinder block 42 as shown in FIG. 4 so as to be located between mutually adjacent second valve holes 64.

Then, as shown in FIG. 1, the first valve holes 63 and second valve holes 64 are oppositely located while sandwiching the axis O. Moreover, respective centers of the first valve holes 63 and first plunger holes 47, and respective centers of the second valve holes 64 and second plunger holes 57 are located so as to be located on straight lines extending in radial directions from the axis O as shown in FIG. 4.

As shown in FIG. 1, each first oil passage 65 is formed along a radial direction of the cylinder block 42 so as to connect the bottom of a first plunger hole 47 with a portion of a first valve hole 63 between the first oil chamber 61 and second oil chamber 62.

In each first valve hole 63, a port U of the first oil passage 65, which communicates with a corresponding first plunger hole 47, is formed between the first oil chamber 61 and second oil chambers 62. A spool type first relay valve 66 is slidably located in each first valve hole 63. The first relay valves 66 are equivalent to the distributing valves. Since each is located in the first valve holes 63 respectively, the first relay valves 66 are arranged and constructed similarly to the first valve holes 63 of the cylinder block 42. Accordingly, the first relay valves 66 are located parallel to the axis O of the cylinder block 42.

A cover plate 63b which is fastened to the cylinder block 42 with bolts 63a is installed in the opening of each first valve hole 63 by the side of the yoke 23. A coil spring 63c is installed inside between the cover plate 63b and a first relay valve 66, and the first relay valve 66 is urged toward a radial bearing 16 by the coil spring 63c. The first relay valves 66 reciprocate along the axial direction of the cylinder block 42 by abutting on the inner ring 16b of the radial bearing 16, and achieve displacements as shown in FIG. 6.

Figure 6:
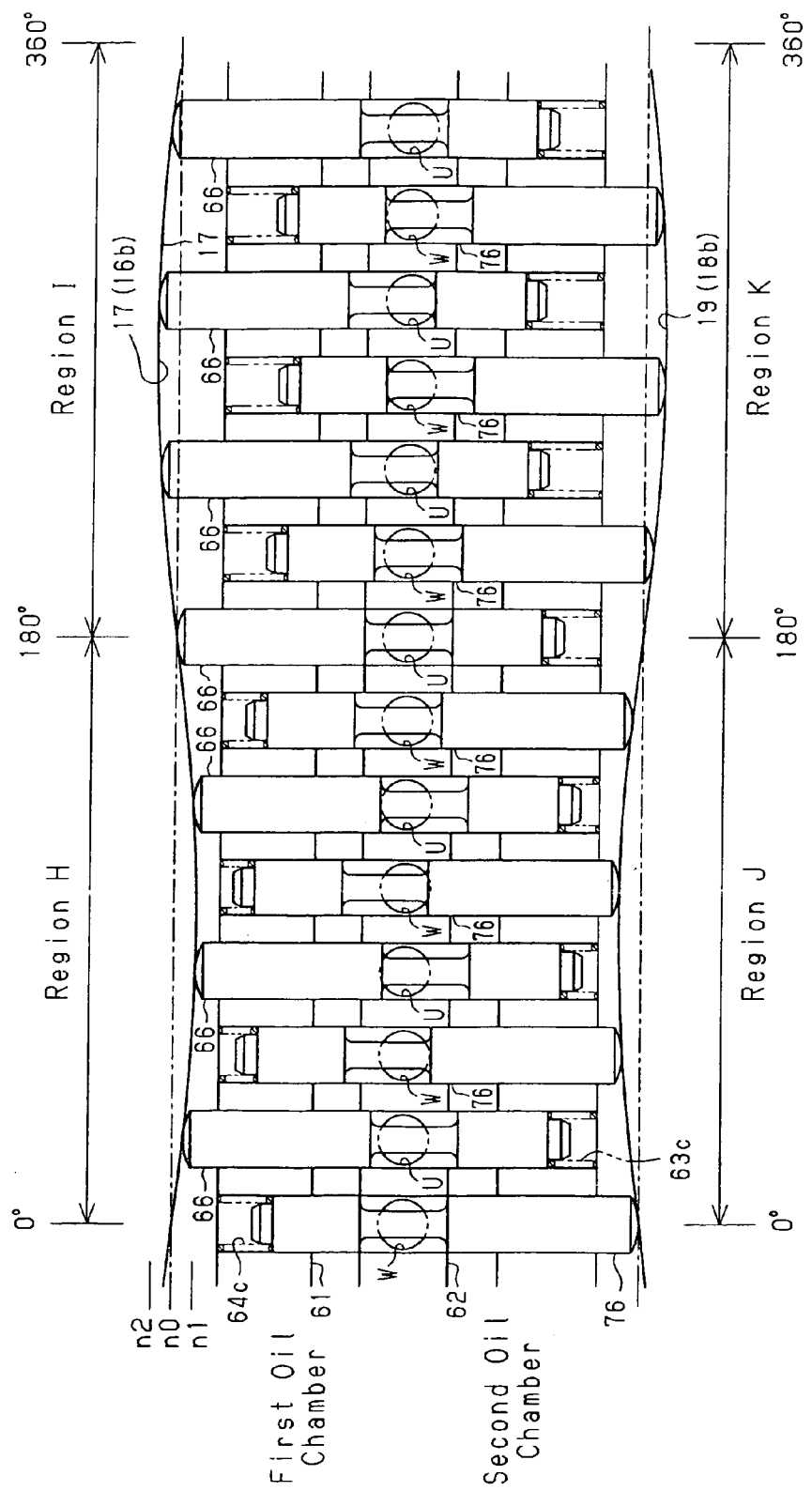
FIG. 6 is an explanatory diagram showing the opening timing of ports by first relay valves and second relay valves.

As shown in FIG. 6, the inner ring 16b reciprocates each first relay valve 66 between a first opening position n1, where a port U and a second oil chamber 62 communicate with each other, and a second opening position n2, where the port U and a first oil chamber 61 communicate with each other, while centering a port closing position n0.

In the first hydraulic system 100, a region H is set in a range of 0 to 180°, and a region I is set in a range of 180 to 360° (0°) according to a rotation angle around the axis O of the cylinder block 42. Here, the region H means a region including all of sections where the ports U and second oil chamber 62 communicate with each other, and the region I comprises a region including all of sections where the ports U and first oil chamber 61 communicate with each other.

When the above-mentioned swash plate surface 44 is displaced from an upright position to a maximum negative tilt angular position, the stroke volume VP of the first hydraulic system 100 at this time becomes VMmax from zero as shown in FIG. 14. In FIG. 14, the vertical amplitude shows stroke volume per one revolution of the first hydraulic system 100 or second hydraulic system 200, and the horizontal amplitude shows the output rotation rate Nout of the yoke 23 (output rotating section). In this figure, a continuous line shows the change of the stroke volume VP of the first hydraulic system 100, and a dotted and dashed line shows the change of the stroke volume VM of the second hydraulic system 200. Then, in this embodiment, a displacement of the hydraulic fluid of the first hydraulic system 100 is set so that the output rotation rate Nout (rotation rate of the yoke 23) may become the speed within a range of Nin to 2Nin, when the input rotation rate of the input shaft 21 is Nin.

The stroke volume of the first hydraulic system 100 means the volume of hydraulic fluid with which the plunger space formed by the first plunger 43 and first plunger hole 47 delivers to and receives from the first oil chamber 61 and second oil chamber 62 during one rotation of the cylinder block 42. The stroke volume of the second hydraulic system 200 means the volume of hydraulic fluid with which the plunger space formed by the second plunger 58 and second plunger hole 57 delivers to and receives from the first oil chamber 61 and second oil chamber 62 during one rotation of the yoke 23 (output rotating section) to the cylinder block 42.

In addition, in this embodiment, as shown in FIG. 1, when the swash plate surface 44 tilts in a negative direction, hydraulic fluid is drawn through the ports U to the first plunger holes 47 in a rotation angle range from 0 to 180° around the axis O of the cylinder block 42, and the hydraulic fluid is delivered from the first plunger holes 47 through the ports U in the rotation angle range from 180 to 360° (0°). Then, when the swash plate surface 44 tilts in a positive direction, hydraulic fluid is delivered through the port U from the first plunger hole 47 in a rotation angle range from 0 to 180° around the axis O of the cylinder block 42, and the hydraulic fluid is drawn to the first plunger holes 47 through the ports U in the rotation angle range from 180 to 360° (0°). An oil chamber which delivers the hydraulic fluid, and an oil chamber which draws it are determined by the regions H and I corresponding to the rotation angle of the cylinder block 42 around the axis O.

As shown in FIGS. 1 and 3, each second oil passage 75 is formed along a radial direction of the cylinder block 42 so as to connect the bottom of a second plunger hole 57 with a portion of a second valve hole 64 between the first oil chamber 61 and second oil chamber 62. In each second valve hole 64, a port W of the second oil passage 75 which communicates with a corresponding second plunger hole 57 is formed between the first oil chamber 61 and second oil chambers 62. In each second valve hole 64, a spool type second relay valve 76 is slidably located so as to become parallel to the above-mentioned second plungers 58. The second relay valves 76 are equivalent to the distributing valves. Since being located in the second valve holes 64 respectively, the second relay valves 76 are arranged and constructed similarly to the second valve holes 64 of the cylinder block 42. Accordingly, the second relay valves 76 are located in parallel to the axis O of the cylinder block 42.

A cover plate 64b which is fastened to the cylinder block 42 with a plurality of bolts 64a is installed in the opening of the second valve hole 64 that faces the swash plate surface 44. A coil spring 64c is installed inside between each cover plate 64b and each second relay valve 76, and each second relay valve 76 is urged toward the radial bearing 18 by each coil spring 64c. Each second relay valve 76 reciprocates along the axial direction of the cylinder block 42 by abutting on the inner ring 18b of the radial bearing 18, and achieves a displacement as shown in FIG. 6.

In addition, in FIG. 6, although the relative position between the inner ring 16b of the left side radial bearing 16 and the inner ring 18b of the right side radial bearing 18 changes since both rings are made rotatable to the outer ring 16a and inner ring 18b to which both rings correspond respectively, the change is disregarded for convenience of explanation.

In the second hydraulic system 200, a region J is set in a range of 0 to 180°, and a region K is set in a range of 180 to 360° (0°) according to relative rotation angle of the yoke 23 around the axis O to the cylinder block 42. Here, the region J means a region including all of sections where the ports W and first oil chamber 61 communicate with each other, and the region K comprises a region including all of the sections where the ports W and second oil chamber 62 communicate with each other.

In addition, in this embodiment, as shown in FIG. 3, when the swash plate surface 44 tilts in a negative direction, hydraulic fluid is drawn through the ports W to the second plunger holes 57 in a relative rotation angle range from 0 to 180° of the yoke 23 (output rotating section) around the axis O to the cylinder block 42. Furthermore, the hydraulic fluid is delivered from the second plunger hole 57 through the ports W in the rotation angle range from 180 to 360° (0°).

When the swash plate surface 44 tilts in a positive direction, hydraulic fluid is delivered through the ports W from the second plunger hole 57 in a relative rotation angle range from 0 to 180° of the yoke 23 (output rotation section) around the axis O to the cylinder block 42, and the hydraulic fluid is drawn to the second plunger hole 57 through the ports W in the rotation angle range from 180 to 360° (0°).

An oil chamber which delivers the hydraulic fluid, and an oil chamber which draws it are determined by the regions J and K corresponding to relative rotation angle of the yoke 23 (output rotation section) around the axis O of the cylinder block 42.

A hydraulic closed circuit C is constructed by the above-mentioned first plunger holes 47, second plunger holes 57, first oil chamber 61, second oil chamber 62, first valve holes 63, second valve holes 64, first oil passages 65, second oil passages 75, ports U, and ports W.

As shown in FIGS. 1 and 3, in order to charge hydraulic fluid into the above-mentioned hydraulic closed circuit C, a shaft hole 99 is drilled along the axis O in the input shaft 21. The shaft hole 99 has an introductory oil passage 99a extending radially in a part of the sidewall member 28 corresponding to the through hole 36. This introductory oil passage 99a communicates with a peripheral groove 21b formed on the outer circumferential surface of the input shaft 21. An oil passage 28a communicating with the peripheral groove 21b is provided in the sidewall member 28.

The above-mentioned oil passage 28a communicates with an oil passage 91a provided in the cradle holder 91, and an oil passage 28b provided in the sidewall member 28. Hydraulic fluid is supplied from the charge pump, which is not shown, in the above-mentioned oil passages 28b, 91a, and 28a.

On the other hand, in the input shaft 21, charging valves 90 (non-return valve), which opens and closes valve seats that can communicate with the shaft hole 99, are located respectively in the first oil chamber 61 and second oil chamber 62. A valve seat of each charging valve 90 opens until hydraulic pressure in the hydraulic closed circuit C reaches charge pressure in the shaft hole 99, and supplies the hydraulic fluid in the shaft hole 99 to the hydraulic closed circuit C. Moreover, the charging valves 90 prevent hydraulic fluid from flowing backwards to the shaft hole 99.

Operation of Stepless Transmission

Now, operation in connection with the tilt of the cradle 45 of the stepless transmission 20 constructed as mentioned above will be explained. In addition, for convenience of explanation, assuming that the input rotation rate Nin transmitted to the input shaft 21 from the crankshaft of the engine 22 is constant, explanation will be provided.

Case of Output Rotation Rate Nout Being Equal to Nin

Figure 13:
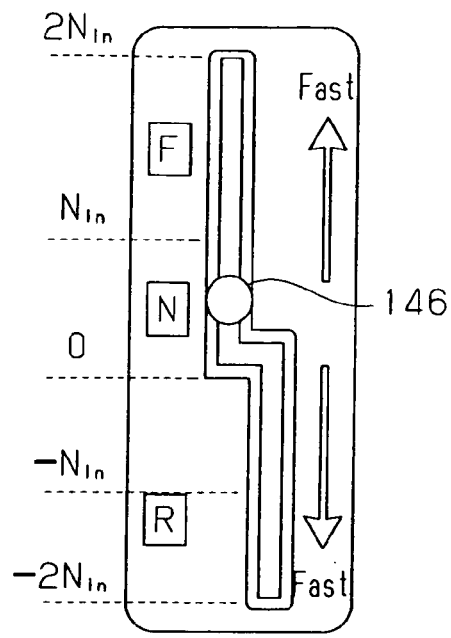
FIG. 13 is a top view of a shift lever.

The swash plate surface 44 is positioned in an upright position through the cradle 45 by operating the shift lever 146 shown in FIG. 13. In this state, the cylinder block 42 rotates the rotation rate Nin in the positive direction through the input shaft 21 due to driving force of the engine 22. At this time, although the output shaft 155 rotates in the direction opposite to the cylinder block 42, this state is called positive-directional rotation.

When the swash plate surface 44 is in a neutral state of an upright position to the axis O of the cylinder block 42, the plungers 43 of the first hydraulic system 100 are not reciprocated by the swash plate surface 44. Accordingly, hydraulic fluid does not circulate through the inside of the hydraulic closed circuit C in this state. For this reason, in the second hydraulic system 200, each plunger 58 abuts on and engages with the rotation slope 51 through the shoe 60 in the state in which stroke motion cannot be performed. Therefore, the cylinder block 42 and rotation slope 51 become in a direct coupling state, and integrally rotate.

That is, this state is the state in which the input shaft 21 and gear 151 link directly. Accordingly, the positive-directional rotation provided to the rotation slope 51 is transmitted to the final reduction gear through the yoke 23, coupled forward clutch 152, and output shaft 155.

When the above-mentioned swash plate surface 44 is located in the upright position, the stroke volume VP of the first hydraulic system 100 becomes zero as shown in FIG. 14, and hence, the output rotation rate Nout (rotation rate of the yoke 23) becomes equal to the input rotation rate Nin.

Case of Output Rotation rate Nout Being Between Nin and 2Nin

By operating the shift lever 146 to tilt the swash plate surface 44 in a negative direction through the cradle 45, the swash plate surface 44 is located in a region between a predetermined negative tilt angular position and the upright position. The predetermined negative tilt angular position means a position where the absolute value of the stroke volume VP of the first hydraulic system 100 becomes equal to the absolute value (=VMmax) of the stroke volume VM of the second hydraulic system 200.

In this case, the cylinder block 42 rotates rotation rate Nin through the input shaft 21 by driving force of the engine 22. Then, the first hydraulic system 100 draws hydraulic fluid through the ports U to the first plunger holes 47 in a rotation angle range of 0 to 180° of the cylinder block 42 around the axis O, and delivers the hydraulic fluid from the first plunger holes 47 through the ports U in the rotation angle range of 180 to 360° (0°). Oil chambers which deliver and draw the hydraulic fluid are determined by the regions H and I corresponding to the rotation angle of the cylinder block 42 around the axis O.

Furthermore, the volume of hydraulic fluid, which the first hydraulic system 100 delivers and draws, increases as the tilt angle of the swash plate surface 44 to a negative side becomes large. At this time, the second hydraulic system 200 draws hydraulic fluid through the ports W to the second plunger holes 57 in a relative rotation angle range of 0 to 180° of the yoke 23 (output rotation section) to the cylinder block 42 around the axis O, and delivers the hydraulic fluid from the second plunger holes 57 through the ports W in the range of 180 to 360° (0°). An oil chamber which delivers the hydraulic fluid, and an oil chamber which draws it are determined by the regions J and K corresponding to the relative rotation angle of the yoke 23 (output rotation section) to the cylinder block 42 around the axis O.

As a consequence, the rotation slope 51 is rotated at a speed synthesized (summed) from the input rotation rate Nin at which the cylinder block 42 is driven through the input shaft 21, and the positive-directional rotation rate by protruding pressure actions of the plungers 58 on the rotation slope 51. The positive-directional rotation given to this rotation slope 51 is transmitted to the final reduction gear as the positive-directional rotation through the yoke 23, coupled forward clutch 152, and output shaft 155.

Figure 12:
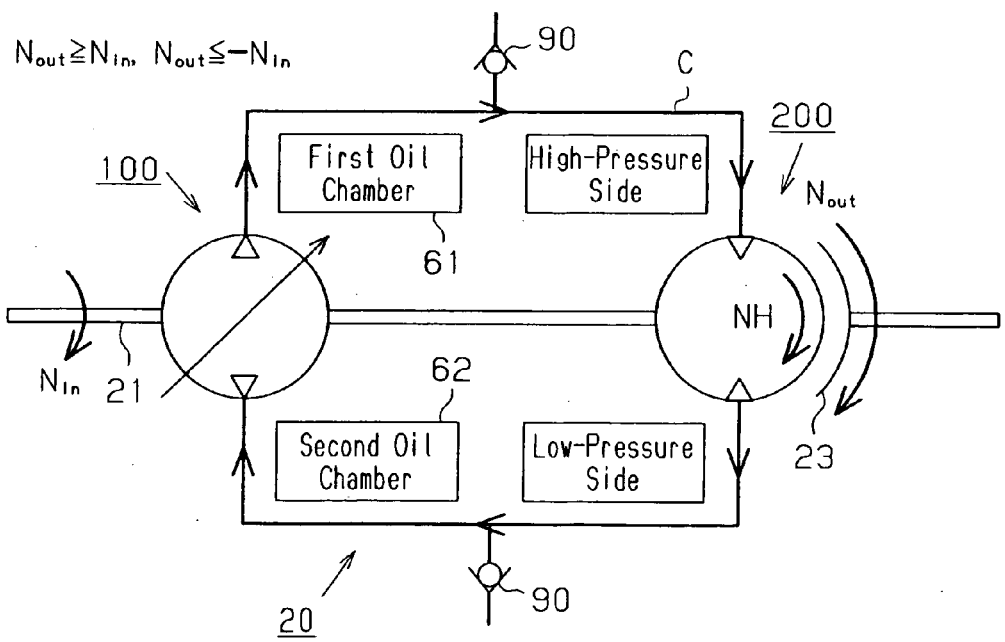
FIG. 12 is a conceptual drawing for explaining an operation of the stepless transmission similarly.

When the swash plate surface 44 is displaced from the upright position toward a predetermined negative tilt angular position, the stroke volume VP of the first hydraulic system 100 increases from zero to VMmax in FIG. 14, and in accordance with it, the output number of revolution Nout is accelerated from Nin to 2Nin. In addition, the stroke volume VM of the second hydraulic system 200 at the time that the output rotation rate Nout changes to 2Nin from Nin and is still kept at VMmax. FIG. 12 shows the state of flow and rotation of hydraulic fluid in this state, and at this time, the hydraulic fluid flows in the hydraulic closed circuit C as indicated by the arrows in the figure. In addition, the arrows proximate the rotation rate Nin and Nout show rotary directions of corresponding members.

Case of Output Rotation Rate Nout Being Between Zero and Nin By operating the shift lever 146 to tilt the swash plate surface 44 in a positive direction through the cradle 45, the swash plate surface 44 is relocated from the upright position to a positive tilt angular position. In addition, among positive tilt angular positions, a position where the absolute value of the stroke volume VP of the first hydraulic system 100 becomes equal to the absolute value of the stroke volume VM of the second hydraulic system 200 is made a predetermined negative tilt angular position.

In this case, since the swash plate surface 44 tilts in a positive direction, the cylinder block 42 rotates through the input shaft 21 by driving force of the engine 22. Then, the first hydraulic system 100 delivers hydraulic fluid through the ports U from the first plunger holes 47 in a rotation angle range from 0 to 180° of the cylinder block 42 around the axis O. Furthermore, the first hydraulic system 100 draws the hydraulic fluid to the first plunger holes 47 through the ports U in the range from 180 to 360° (0°). An oil chamber which delivers the hydraulic fluid, and an oil chamber which draws it are determined by the regions H and I corresponding to the rotation angle of the cylinder block 42 around the axis O. Furthermore, the volume of hydraulic fluid which the first hydraulic system 100 delivers and draws increase as the tilt angle of the swash plate surface 44 in a positive direction becomes large.

At this time, the second hydraulic system 200 delivers hydraulic fluid through the ports W from the second plunger holes 57 in a relative rotation angle range from 0 to 180° of the yoke 23 (output rotation section) to the cylinder block 42 around the axis O. In addition, the second hydraulic system 200 draws the hydraulic fluid to the second plunger holes 57 through the ports W in the range from 180 to 360° (0°). An oil chamber which delivers the hydraulic fluid, and an oil chamber which draws it are determined by the regions J and K corresponding to the relative rotation angle of the yoke 23 (output rotation section) to the cylinder block 42 around the axis O.

As a consequence, by pressure actions of the plungers 58 on the rotation slope 51, rotation reverse to the case of output rotation rate Nout being between Nin and 2Nin is obtained. Accordingly, the rotation rate synthesized (summed) from the above-mentioned reverse-directional rotation rate and the positive-directional rate of the cylinder block 42 is transmitted to the final reduction gear through the yoke 23, coupled forward clutch 152, and output shaft 155.

Since the sum of the rotation rate at this time becomes the positive-directional rotation rate, which is reduced by the reverse-directional rotation rate, the output rotation rate Nout becomes small in comparison with the "case of output rotation rate Nout being Nin."

In this embodiment, when the swash plate surface 44 is displaced from the upright position toward a maximum positive tilt angular position, the stroke volume VP of the first hydraulic system 100 increases from zero to −VMmax (here, the sign "−" means the case where hydraulic fluid is delivered to the second oil chamber 62 from the ports U) in FIG. 14, and in accordance with it, the output rotation rate Nout is decelerated from Nin to zero.

In addition, the stroke volume VM per one rotation of the second hydraulic system 200 at the time that the output rotation rate Nout changes to zero from Nin is −VMmax. (Here, the sign "−" means the case where hydraulic fluid is drawn from the second oil chamber 62 to the ports W.)

Figure 11:
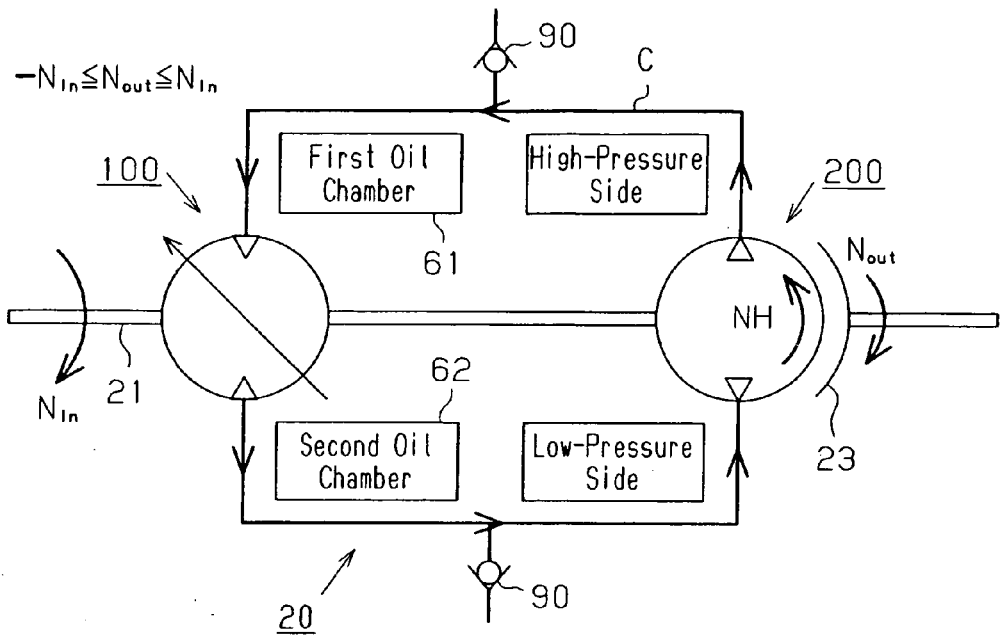
FIG. 11 is a conceptual drawing for explaining an operation of the stepless transmission.

FIG. 11 is a schematic diagram of the state at this time. The first oil chamber 61 has higher pressure than the second oil chamber 62, and hydraulic fluid flows in the hydraulic closed circuit C as indicated by the arrows in the figure. In addition, arrows proximate the rotation rate Nin and Nout show rotary directions of corresponding members.

Case of Output Number of Revolution Nout Being Zero

The yoke 23 is stopped by shutting down input rotation from the engine 22 by the clutch mechanism 300.

Case of Output Rotation Rate Nout Being Less Than Zero

When the shift lever 146 is shifted to a reverse position in a disengaged state of the clutch mechanism 300, the forward clutch 152 of the gearshift device 150 is disengaged according to this operation of the shift lever 146, and the reverse clutch 153 is engaged. Since the rotation from the engine 22 and its follower is not transferred to the stepless transmission 20 at this time, the pressure actions of plungers 58 on the rotation slope 51 are eliminated, and hence, the yoke 23 becomes free from the second hydraulic system 200. For this reason, it is possible to easily perform the connection of the reverse clutch 153 of the yoke 23, that is, change at the time for reverse. Then, after finishing the shifting of the shift lever 146 to the reverse point, the clutch mechanism 300 is again changed into the connection state. Furthermore, also when returning to the advance side, the foot clutch pedal is held down, and the clutch mechanism 300 is entered into the disengaged state. At this time, it is possible for the same reason to easily perform the change at the time for advancing.

Case of Output Rotation Rate Nout Being Between Zero and −Nin

After the connection of the reverse clutch 153 is performed, changing conditions of output number of revolution Nout, and the maximum stroke volume of the first hydraulic system 100 and second hydraulic system 200 are the same as the case for advancing (normal rotation) as shown in FIG. 11, that is, the case of the output rotation rate Nout being between zero and Nin. Hence, its description is omitted. FIG. 11 shows the flow and rotary directions of hydraulic fluid. Rotation given to the rotation slope 51 is transmitted to the final reduction gear through the yoke 23, idler gear 156, idler gear 157, reverse clutch 153 and output shaft 155.

Case of Output Rotation Rate Nout Being Between Nin and −2Nin

Also in this case, since operation of the first hydraulic system 100 and second hydraulic system 200 is the same as the case of the output rotation rate Nout being between Nin and 2Nin, its description is omitted. FIG. 12 shows the flow and rotary directions of hydraulic fluid. Similarly to the above-mentioned cases, rotation given to the rotation slope 51 is transmitted to the final reduction gear through the yoke 23, idler gear 156, idler gear 157, reverse clutch 153 and output shaft 155.

According to this embodiment, the following effects are obtained.

(1) The hydraulic stepless transmission of this embodiment comprises the first hydraulic system 100, which has the first plungers 43 and the cradle 45 (swash plate) that the first plungers 43 abut on, and the second hydraulic system 200, which has the second plungers 58 and the first yoke member 23A (swash plate) that the second plungers 58 abut on. In addition, the first plunger holes 47 and second plunger holes 57, which contain the first plungers 43 and second plungers 58, respectively, are formed in the common cylinder block 42, and the hydraulic closed circuit, which connects the first plunger holes 47 and second plunger holes 57, is formed in the cylinder block 42. Moreover, the first valve holes 63 and second valve holes 64 (distributing valve holes), which contain the first relay valves 66 and second relay valves 76 (distributing valves) that switch the flow directions of the hydraulic fluid in the hydraulic closed circuit C, respectively, are formed in the cylinder block 42. Then, the hydraulic stepless transmission has the input shaft 21, which extends through the cylinder block 42, and is constructed so that the input shaft 21 and cylinder block 42 may synchronously rotate. Further, the first plunger holes 47 and second plunger holes 57 are formed respectively in parallel to the input shaft 21. Moreover, the rotation slope 51 of the second hydraulic system 200 is rotatably supported around the axis O of the cylinder block 42.

Moreover, the first and second plungers 43 and 58 are urged respectively toward the cradle 45 and first yoke member 23A (swash plate) by the coil springs 43b and coil springs 58b which are provided in the first plunger holes 47 and second plunger holes 57, respectively. Furthermore, the cradle 45 (swash plate) of the first hydraulic system 100 is supported by the outer ring 39a of the conical roller bearing 39 (first combined thrust and radial bearing), which supports the input shaft 21. Furthermore, the first yoke member 23A (swash plate) of the second hydraulic system 200 is supported by the outer ring 31a of the conical roller bearing 31 (second combined thrust and radial bearing), which supports the input shaft 21. Then, the inner rings 39b and 31b of the conical roller bearings 39 and 31 are regulated for the movement in the axial direction to the input shaft 21.

As a consequence, each of the plungers 43 and 58 is urged toward the cradle 45 and first yoke member 23A respectively by each of the coil springs 43b and 58b, and this cradle 45 and first yoke member 23A are pushed on to the conical roller bearings 39 and 31. For this reason, the force in the axial direction of the input shaft 21 is constantly applied to the conical roller bearings 39 and 31.

Accordingly, differently from the former, it is possible to provide preload to the conical roller bearings 39 and 31 while omitting complicated operation by shim adjustment.

(2) The hydraulic stepless transmission of this embodiment comprises the cover 15 (first regulating member), which extends in parallel to the side face of the inner ring 39b of the conical roller bearing 39 (first combined thrust and radial bearing) and is separated by a minute distance from the side face. Moreover, the hydraulic stepless transmission of this embodiment comprises the second yoke member 23B (second regulating member), which extends in parallel to the side face of the inner ring 31b of the conical roller bearing 31 (first combined thrust and radial bearing) and has the locking stepped-section 50d, which is separated by minute distance from the side face.

For this reason, even if the cylinder block 42 is pushed on either of the conical roller bearings 39 and 31, the inner rings 39b and 31b abut on the cover 15 or locking stepped-section 50d, which is parallel to and is separated by minute distance from either of the side faces of the inner rings 39b and 31b of the conical roller bearings 39 and 31. Therefore, it is possible to minimize the maximum clearance of the inner rings 39b and 31b and outer rings 39a and 31a of the conical roller bearings 39 and 31.

(3) In this embodiment, the first valve holes 63 and second valve holes 64 (distributing valve holes) are formed in parallel to the input shaft 21 while adjoining the input shaft 21 nearer than the first plunger holes 47 and second plunger holes 57. Moreover, the first oil passages 65 and second oil passages 75, which connect the first plunger holes 47 and second plunger holes 57, and the first valve holes 63 and second valve holes 64 respectively are formed along the radial directions of the cylinder block 42. As a result, it becomes possible to make the first oil passages 65 and second oil passages 75 the shortest possible, and to reduce the useless volume of hydraulic fluid.

(4) In this embodiment, the first valve holes 63 and second valve holes 64 (distributing valve holes) are formed in parallel to the input shaft 21 while extending through the cylinder block 42. As a result, since it becomes possible to form those holes only by performing machining from one side of the cylinder block 42, it becomes possible to reduce machining man-hours, and also to improve machining accuracy.

(5) In the hydraulic stepless transmission of this embodiment, the first oil chamber 61 (high pressure oil chamber) and second oil chamber 62 (low pressure oil chamber) are formed while adjoining the input shaft 21 nearer than the first plunger holes 47 and second plunger holes 57, and are juxtaposed in the axial direction of the cylinder block 42. Moreover, the spline fitting of the cylinder block 42 is performed to the input shaft 21, and the second oil chamber 62 (low pressure oil chamber) is made to communicate with the spline section 21c formed in the input shaft 21.

As a result, it becomes possible to lubricate the spline section 21c without specially providing a lubricant path for the spline sections 21c. Moreover, although hydraulic fluid is leaked from the spline section 21c to the outside of the cylinder block 42, it is the leak from the low-pressure second oil chamber 62, and hence, the volumetric efficiency of the hydraulic stepless transmission never deteriorates.

(6) In the hydraulic stepless transmission of this embodiment, the first yoke member 23A (swash plate) of the second hydraulic system 200 is cut for its outer circumferential surface, while making the line P perpendicular to the rotation slope 51 (swash plate surface) of the first yoke member 23A the first machining central axis. Next, the outer circumferential surface of the material WO is cut while making the axis O (center line of the input shaft 21) of the cylinder block 42 a machining central axis, that is, making the axis M of the material WO the machining central axis, and the peripheral surface SU including the outer circumferential surface for the connection flange 37 is formed (refer to FIGS. 9(a) and 9(b)). Then, a line α is assumed, in which the line α is parallel to the axis O (center line of the input shaft 21) of the cylinder block 42, that is, parallel to the axis M of the material WO, and is offset in a predetermined direction. The connection flange 37 is formed by cutting the outer circumferential surface of the material WO while making this line α the second machining central axis. As a result, it becomes possible to adjust the rotation balance of the first yoke member 23A (swash plate) of the second hydraulic system 200 only by simple cutting.

(7) The power transmission 400 of this embodiment comprises the above-mentioned hydraulic stepless transmission, and further comprises the clutch mechanism 300 as means for transmitting or shutting down the power to the input shaft 21. Furthermore, the power transmission 400 comprises the gear shift device 150 as means for inputting the turning force of the first yoke member 23A (swash plate) of the second hydraulic system 200, and outputting the rotation in a direction identical or reverse to that of the first yoke member 23A (swash plate) of the second hydraulic system 200. As a result, it is possible to realize the power transmission that has the advantages of the hydraulic stepless transmission described in the above-mentioned items (1) to (6).

(8) In the above-mentioned embodiments, it is possible to release the torque applied to this yoke 23 at the time of switching the rotary direction of the yoke 23 by disengaging the clutch mechanism 300, and to easily switch the rotary direction.

In addition, the embodiment of the present invention is not limited to the above-mentioned embodiments, but may be made as follows.

The structure of the needle bearing 11 and needle bearing 38 in the above-mentioned embodiment may be replaced with ball bearing.

The first valve holes 63 and second valve holes 64 holes, which have the structure extending through to the cylinder block 42, may be formed with bottoms. In this case, it is possible to omit the bolts 63a, cover plates 63b, bolts 64a, and cover plates 64b.

The output end of the input shaft 21 in the side of the yoke 23 may be formed to have a diameter smaller than the diameter of the output gear 24, and to protrude from the end face of the output gear 24, so that the protruded end portion of the input shaft 21 functions as a PTO shaft (Power Takeoff shaft).

The invention claimed is:

1. A hydraulic stepless transmission comprising
a first hydraulic system that has a first plunger and a swash plate, which the first plunger abuts on,
a second hydraulic system that has a second plunger and a swash plate, which the second plunger abuts on, and
a cylinder block, wherein formed in the cylinder block are first and second plunger holes that contain the first and second plungers, respectively, a hydraulic closed circuit that connects the first and second plunger holes, and a distributing valve hole that contains a distributing valve for switching flow direction of hydraulic fluid in the hydraulic closed circuit,
a shaft provided that extends through the cylinder block, the shaft and the cylinder block synchronously rotate, the first and second plunger holes are formed in parallel to the shaft, respectively, and the swash plate of the second hydraulic system is rotatably supported around the shaft, the first and second plungers are urged toward the swash plates by springs provided in the corresponding first and second plunger holes, respectively,
first and second combined thrust and radial bearings are provided supporting the shaft in which each includes inner and outer rings, the swash plate of the first hydraulic system is supported by the outer ring of the first combined thrust and radial bearing, the swash plate of the second hydraulic system is supported by the outer ring of the second combined thrust and radial bearing, and movement of inner rings of the first and second combined thrust and radial bearings in an axial direction of the shaft is regulated, and
a high pressure oil chamber and a low pressure oil chamber juxtaposed along an axial direction in the cylinder block so as to be closer to the shaft than the first and second plunger holes;
wherein a spline section is formed in the shaft, and the shaft is fit into the cylinder block at the spline section; and
wherein the low-pressure oil chamber communicates with the spline section of the shaft.

2. The hydraulic stepless transmission according to claim 1, further comprising a first regulating member, which has a surface that is parallel to a side face of the inner ring of the first combined thrust and radial bearing, and is spaced apart by a minute distance from the side face of the inner ring, and a second regulating member, which has a surface that is parallel to a side face of the inner ring of the second combined thrust and radial bearing and is spaced apart by a minute distance from the side face of the inner ring.

3. The hydraulic stepless transmission according to claim 1, wherein the distributing valve hole is located in parallel to the shaft and is closer to the shaft than the plunger hole; and
wherein an oil passage that connects the plunger hole and the distributing valve hole is formed in a radial direction.

4. The hydraulic stepless transmission according to claim 1, wherein the distributing valve hole is formed in parallel to the shaft so as to extend through the cylinder block.

5. The hydraulic stepless transmission according to claim 1, wherein an outer circumferential surface of the swash plate of the second hydraulic system is formed through machining by using a first machining central axis, which is a line perpendicular to a swash plate surface of this swash plate, a machining central axis, which is a center line of the shaft, and a second machining central axis, which is a line that is parallel to a center line of the shaft and is offset to a side where a gap narrows between the swash plate surface and a surface opposite to the swash plate surface.

6. A power transmission comprising:
a hydraulic stepless transmission including a cylinder block and a first hydraulic system which has a first plunger and a swash plate, which the first plunger abuts on, and a second hydraulic system, which has a second plunger and a swash plate that the second plunger abuts on, wherein first and second plunger holes, which contain the first and second plungers, respectively, are formed in the cylinder block,
a hydraulic closed circuit that connects the first and second plunger holes is formed in the cylinder block,
a distributing valve hole that contains a distributing valve for switching flow direction of hydraulic fluid in the hydraulic closed circuit is formed in the cylinder block,
a shaft provided that extends through the cylinder block, the shaft and the cylinder block synchronously rotate, the first and second plunger holes are formed in parallel to the shaft respectively, and the swash plate of the second hydraulic system is rotatably supported around the shaft, the first and second plungers are urged toward the swash plates by springs provided in the corresponding first and second plunger holes respectively, first and second combined thrust radial bearings are provided that each include inner and outer rings, with the swash plate of the first hydraulic system supported by the outer ring of the first combined thrust and radial bearing that supports the shaft, the swash plate of the second hydraulic system is supported by the outer ring of the second combined thrust and radial bearing that supports the shaft, and movement of the inner rings of the first and second combined thrust and radial bearings in an axial direction of the shaft is regulated;

a high pressure oil chamber and a low pressure oil chamber juxtaposed along an axial direction in the cylinder block so as to be closer to the shaft than the first and second plunger holes, wherein a spline section is formed in the shaft, with the shaft fit into the cylinder block at the spline section, and the low-pressure oil chamber communicates with the spline section of the shaft;

a device which transmits or shuts down power to the shaft; and a device which inputs turning force from the swash plate of the second hydraulic system and outputs rotation in a direction identical or reverse to that of the swash plate of the second hydraulic system.

7. The hydraulic stepless transmission according to claim 6, further comprising a first regulating member having a surface parallel to a side face of the inner ring of the first combined thrust and radial bearing, and spaced apart by a minute distance from the side face of the inner ring, and a second regulating member having a side face parallel to a side face of the inner ring of the second combined thrust and radial bearing and spaced apart by a minute distance from the side face of the inner ring.

8. The hydraulic stepless transmission according to claim 6, wherein the distributing valve hole is parallel to the shaft and closer to the shaft than the plunger hole, wherein an oil passage that connects the plunger hole and the distributing valve hole is formed in a radial direction.

9. The hydraulic stepless transmission according to claim 6, wherein the distributing valve hole is formed parallel to the shaft so as to extend through the cylinder block.

10. The hydraulic stepless transmission according to claim 6, wherein an outer circumferential surface of the swash plate of the second hydraulic system is formed through machining by using a first machining central axis, which is a line perpendicular to a swash plate surface of this swash plate, a machining central axis, which is a center line of the shaft, and a second machining central axis, which is a line that is parallel to a center line of the shaft and is offset to a side where a gap narrows between the swash plate surface and a surface opposite to the swash plate surface.

11. A hydraulic stepless transmission comprising:
   a first hydraulic system including a first plunger and a swash plate, which the first plunger abuts on;
   a second hydraulic system including a second plunger and a swash plate, which the second plunger abuts on;
   a cylinder block including:
      first and second plunger holes containing first and second plungers and springs;
      a hydraulic closed circuit connecting the first and second plunger holes; and
      a distributing valve hole containing a distributing valve for switching flow direction of hydraulic fluid in the hydraulic closed circuit;
   a shaft extending through the cylinder block, in which the shaft and the cylinder block synchronously rotate, the first and second plunger holes are formed parallel to the shaft and the swash plate of the second hydraulic system is rotatably supported around the shaft the first and second plungers are urged toward the swash plates by the springs of the first and second plunger holes;
   first and second combined thrust and radial bearings supporting the shaft in which each includes inner and outer rings, with the swash plate of the first hydraulic system supported by the outer ring of the first combined thrust and radial bearing, and the swash plate of the second hydraulic system supported by the outer ring of the second combined thrust and radial bearing; and
   means for regulating movement of inner rings of the first and second combined thrust and radial bearings in an axial direction of the shaft; and
   a high pressure oil chamber and a low pressure oil chamber juxtaposed along an axial direction in the cylinder block so as to be closer to the shaft than the first and second plunger holes, wherein a spline section is formed in the shaft, and the shaft is fit into the cylinder block at the spline section, and the low-pressure oil chamber is in fluid communication with the spline section of the shaft.

12. The hydraulic stepless transmission according to claim 11, wherein the means for regulating movement includes:
   a first regulating member having a surface parallel to a side face of the inner ring of the first combined thrust and radial bearing, and spaced apart by a minute distance from the side face of the inner ring; and
   a second regulating member having a surface parallel to a side face of the inner ring of the second combined thrust and radial bearing and spaced apart by a minute distance from the side face of the inner ring.

13. The hydraulic stepless transmission according to claim 11, wherein the distributing valve hole is located in parallel to the shaft and closer to the shaft than the plunger hole, and an oil passage connecting the plunger hole and the distributing valve hole is formed in a radial direction.

14. The hydraulic stepless transmission according to claim 11, wherein the distributing valve hole is formed parallel to the shaft so as to extend through the cylinder block.

15. The hydraulic stepless transmission according to claim 11, wherein an outer circumferential surface of the swash plate of the second hydraulic system is formed through machining by using a first machining central axis, which is a line perpendicular to a swash plate surface of this swash plate, a machining central axis, which is a center line of the shaft, and a second machining central axis, which is a line that is parallel to a center line of the shaft and is offset to a side where a gap narrows between the swash plate surface and a surface opposite to the swash plate surface.

* * * * *